US010583455B2

(12) United States Patent
Landa et al.

(10) Patent No.: US 10,583,455 B2
(45) Date of Patent: Mar. 10, 2020

(54) COATING APPARATUS

(71) Applicant: ACTEGA METAL PRINT GMBH, Wesel (DE)

(72) Inventors: Benzion Landa, Nes Ziona (IL); Anton Krassilnikov, Rehovot (IL); Moshe Fahima, Rehovot (IL); Ariel Adler, Tel-Aviv (IL)

(73) Assignee: Actega Metal Print GMBH, Wesel (DE)

( * ) Notice: Subject to any disclaimer, the term of this patent is extended or adjusted under 35 U.S.C. 154(b) by 0 days.

(21) Appl. No.: 15/362,983

(22) Filed: Nov. 29, 2016

(65) Prior Publication Data
US 2017/0072427 A1 Mar. 16, 2017

Related U.S. Application Data

(63) Continuation-in-part of application No. PCT/IB2016/053146, filed on May 27, 2016.

(30) Foreign Application Priority Data

May 27, 2015 (GB) .................................. 1509080.6
Aug. 17, 2015 (GB) .................................. 1514618.6

(51) Int. Cl.
*B44C 1/28* (2006.01)
*B05C 19/06* (2006.01)
(Continued)

(52) U.S. Cl.
CPC ............ *B05C 19/06* (2013.01); *B05B 7/1481* (2013.01); *B05B 9/00* (2013.01); *B05B 9/01* (2013.01);
(Continued)

(58) Field of Classification Search
USPC ................. 118/254–270, 621, 206, 300, 304
See application file for complete search history.

(56) References Cited

U.S. PATENT DOCUMENTS 1,905,959 A * 4/1933 Cutler .................... D21H 19/06
118/106
3,127,668 A * 4/1964 Troy .................. B01D 39/2044
156/89.28
(Continued)

FOREIGN PATENT DOCUMENTS

CA 2520442 3/2007
DE 19707157 8/1998
(Continued)

OTHER PUBLICATIONS

U.S. Appl. No. 15/363,615, filed Nov. 29, 2016, to same assignee.

*Primary Examiner* — Yewebdar T Tadesse
(74) *Attorney, Agent, or Firm* — Shalom Wertsberger; Saltamar Innovations

(57) ABSTRACT

An apparatus for coating a donor surface that is movable relative to the apparatus with a layer of metallic particles or particles having a metal-like appearance and reflectivity, the particles adhering more strongly to the surface than to one another. The apparatus comprises an application device to apply to the donor surface a fluid stream within which the particles are suspended, a housing surrounds the application device forming an interior plenum for confining the fluid stream, the housing prevents egress of particles from a sealing gap defined between the rim of the housing and the surface to be coated, and a suction source connected to the housing to extract from the plenum excess fluid and particles. In operation, the suction source extracts substantially all particles that are not in direct contact with the donor (Continued)

surface, leaving substantially a single particle layer adhering to the donor surface upon exiting the apparatus.

20 Claims, 4 Drawing Sheets

(51) Int. Cl.

| | | |
|---|---|---|
| B41J 2/005 | (2006.01) | |
| B41C 1/18 | (2006.01) | |
| B41F 19/00 | (2006.01) | |
| B41M 3/00 | (2006.01) | |
| B41M 5/00 | (2006.01) | |
| B41M 1/00 | (2006.01) | |
| B05D 1/00 | (2006.01) | |
| B41F 31/18 | (2006.01) | |
| B05B 9/00 | (2006.01) | |
| B05C 1/00 | (2006.01) | |
| B05C 11/02 | (2006.01) | |
| B05D 1/12 | (2006.01) | |
| B05D 1/28 | (2006.01) | |
| B05D 3/00 | (2006.01) | |
| B05B 7/14 | (2006.01) | |
| B05C 1/08 | (2006.01) | |
| B05D 3/12 | (2006.01) | |
| C09D 1/00 | (2006.01) | |
| C09D 5/38 | (2006.01) | |
| C23C 24/04 | (2006.01) | |
| B44F 9/10 | (2006.01) | |
| B41M 1/22 | (2006.01) | |
| B05B 9/01 | (2006.01) | |
| B41M 1/04 | (2006.01) | |
| B44C 1/24 | (2006.01) | |

(52) U.S. Cl.
CPC .............. *B05C 1/00* (2013.01); *B05C 1/0808* (2013.01); *B05C 1/0817* (2013.01); *B05C 11/023* (2013.01); *B05D 1/00* (2013.01); *B05D 1/12* (2013.01); *B05D 1/28* (2013.01); *B05D 3/007* (2013.01); *B05D 3/12* (2013.01); *B41C 1/184* (2013.01); *B41F 19/001* (2013.01); *B41F 19/002* (2013.01); *B41F 19/005* (2013.01); *B41F 31/18* (2013.01); *B41J 2/0057* (2013.01); *B41M 1/00* (2013.01); *B41M 1/04* (2013.01); *B41M 1/22* (2013.01); *B41M 3/00* (2013.01); *B41M 3/001* (2013.01); *B41M 5/00* (2013.01); *B41M 5/0017* (2013.01); *B44C 1/24* (2013.01); *B44C 1/28* (2013.01); *B44F 9/10* (2013.01); *C09D 1/00* (2013.01); *C09D 5/38* (2013.01); *C23C 24/04* (2013.01)

(56) References Cited

U.S. PATENT DOCUMENTS

| | | | |
|---|---|---|---|
| 3,264,132 A | 8/1966 | Merrill et al. | |
| 4,465,538 A | 8/1984 | Schmoock | |
| 4,687,531 A * | 8/1987 | Potoczky | B29C 41/04 156/245 |
| 4,985,733 A * | 1/1991 | Kurotori | G03G 15/11 118/116 |
| 5,520,973 A | 5/1996 | Kamen et al. | |
| 5,735,994 A | 4/1998 | Lappe et al. | |
| 6,132,547 A * | 10/2000 | Marsh | B41M 5/0358 101/492 |
| 6,487,002 B1 | 11/2002 | Biegelsen | |
| 6,623,816 B1 | 9/2003 | Tanikawa et al. | |
| 7,776,196 B2 | 8/2010 | Fujimoto et al. | |
| 9,181,085 B2 | 11/2015 | Yoon et al. | |
| 2002/0031645 A1 * | 3/2002 | Sano | B05D 1/00 428/143 |
| 2003/0067529 A1 * | 4/2003 | May | B41J 2/01 347/103 |
| 2005/0244584 A1 | 11/2005 | Afshar | |
| 2006/0003097 A1 | 1/2006 | Andres et al. | |
| 2006/0165444 A1 * | 7/2006 | Nanjo | G03G 15/2053 399/328 |
| 2007/0281136 A1 | 12/2007 | Hampden-Smith et al. | |
| 2008/0166495 A1 | 7/2008 | Maeno et al. | |
| 2010/0208351 A1 | 8/2010 | Nofi et al. | |
| 2012/0285617 A1 * | 11/2012 | Azami | B29C 43/18 156/306.6 |
| 2013/0233189 A1 | 9/2013 | Wittmann et al. | |
| 2013/0295328 A1 | 11/2013 | Baran et al. | |
| 2014/0063161 A1 | 3/2014 | Liu | |
| 2014/0141184 A1 | 5/2014 | Yoon et al. | |
| 2014/0209691 A1 * | 7/2014 | Finn | G06K 19/07769 235/492 |

FOREIGN PATENT DOCUMENTS

| | | | |
|---|---|---|---|
| EP | 0195857 | 12/1985 | |
| EP | 1280612 | 2/2003 | |
| EP | 1359792 | 4/2003 | |
| GB | 712437 A * | 7/1954 | ............. D06Q 1/04 |
| GB | 0830836 | 3/1960 | |
| GB | 2034608 | 6/1980 | |
| GB | 2259888 | 3/1993 | |
| GB | 2353532 | 1/2001 | |
| GB | 2368313 | 1/2002 | |
| GB | 2536361 | 9/2016 | |
| JP | S60-245589 | 12/1985 | |
| JP | H10-70151 | 10/1998 | |
| JP | 2004-090330 | 3/2004 | |
| JP | 2006-263537 | 5/2006 | |
| JP | 2012-066227 | 5/2012 | |
| WO | WO 1995031337 | 11/1995 | |
| WO | WO 1999065699 | 12/1999 | |
| WO | WO 2010077779 | 7/2010 | |
| WO | WO 2012156728 | 11/2012 | |
| WO | WO 2013191535 | 12/2013 | |
| WO | WO 2014063161 | 4/2016 | |
| WO | WO 2016189513 | 12/2016 | |
| WO | WO 2016189514 | 12/2016 | |
| WO | WO 2016189515 | 12/2016 | |
| WO | WO 2016189516 | 12/2016 | |
| WO | WO 2016189519 | 12/2016 | |

* cited by examiner

COATING APPARATUS

RELATED APPLICATIONS

This Patent Application incorporates by reference in their entirety International Patent Application No. PCT/IB2016/053146, filed on May 27, 2016, GB Patent Application No. 1514618.6, filed on Aug. 17, 2015, and GB Patent Application No. 1509080.6, filed on May 27, 2015.

FIELD

The present disclosure relates to an apparatus and method for coating a surface with a layer of metallic or metal-looking particles, in particular with a single layer.

BACKGROUND

In certain types of printing, a film supported by a carrier is transferred to a substrate (e.g., paper, cardboard, plastic films etc.) by application of pressure and/or heat in a desired pattern. One example of this is the foil used in hot or cold foil blocking wherein the film on the foil is metallic or metallic-looking. The latter term is used herein to refer to materials, and any particles thereof, having a metal-like reflectivity.

A problem in using a conventional film coated carrier, be it a sheet, a web or a ribbon, is that the process is wasteful, and therefore expensive. This is because, at the time that it has to be discarded, only a small proportion of the film coating will have been used (e.g., for printing) and most of the film coating will remain on the carrier.

OBJECT

An aspect of the present invention seeks inter alfa to provide an apparatus for applying to a surface, hereinafter termed a donor surface, a coating of individual particles that is transferable to a substrate, in which the parts of the surface from which the coating has been removed in an operating cycle (also termed "exposed regions") can be recoated without substantially increasing the coating thickness on the remaining parts of the surface, so as to enable the entire surface to be re-used time and again.

SUMMARY

In accordance with a first aspect of the present disclosure, there is proposed a coating apparatus for coating with a layer of metallic or metal-looking particles a donor surface movable relative to the apparatus, the apparatus comprising:
a) a supply system of particles suspended in a fluid that does not wet the donor surface, the particles adhering more strongly to the donor surface than to one another,
b) an application device for applying the fluid to the donor surface in a manner to cause the particles suspended in the fluid to adhere to the donor surface, so as to form a substantially continuous particle coating on the surface, and
c) a surplus extraction system operative to extract fluid and remove surplus particles that are not in direct contact with the surface, so as to leave adhering to the donor surface a coating that is substantially only a single particle deep.

The term "supply system" should be construed as a conduit for supplying the required particles, and may be implemented internally to the coating device or to a housing thereof, such as a tank or container, or to an external supply system which transports appropriate particles to the application device. The element(s) capable of delivering the suspended particles at the terminus of the supply system within the application device can be referred to as "supply system outlet(s)", a spray head being a non-limiting example of such an outlet and delivery method.

In the present disclosure, a non-limiting use of the coating apparatus is illustrated as part of a printing system and particles from the donor surface will in use be transferred to a printing substrate. The donor surface may be looked upon as equivalent to a foil used in foil blocking, but with the advantage that it can be restored to its original state after use.

As the coating applied to the donor surface is made up of a mosaic of individual particles, the proportion of the donor surface covered with particles will be less than 100% on account of the interstices between the individual particles. Depending on the use that is subsequently made of the applied particle coating, the proportion of the donor surface that is covered may need only be 95%, or 90%, or 85%, or 80%, or 75%, or 70% or even 65% or less. The acceptable proportion in a printing system would depend, for example, on the color of the particles and the color of the substrate. If printing with light colored particles on a white substrate, acceptable quality may be achieved with only 65% coverage, or possibly even less (e.g., about 40%), whereas printing with white particles on a black substrate would benefit from greater coverage to avoid the color of the substrate showing through and giving the print a grey appearance.

After the particles in selected areas of the donor surface are transferred to a printing substrate, those areas will be left depleted of particles and the donor surface will be exposed. If the donor surface is now again passed through the coating apparatus, a fresh coating of particles will be applied onto the depleted areas. However, the surplus extraction system will remove any particles that are not in direct contact with the donor surface, so that there will be no build up of coatings on areas from which particles are not transferred to the printing substrate.

In some embodiments, particles remaining on the donor surface after an impression has been made on a printing substrate can be removed from the donor surface upstream of the coating apparatus (on the entry side, after the impression on the substrate) so that the entire donor surface may be recoated with fresh particles.

In the present disclosure, the term "suspended in" and its variations is to be understood as "carried by" and like terms, not referring to any particular type of mixture of materials of same or different phase. The fluid which may be a gas or a liquid, can optionally be maintained at a desired controlled temperature.

When the particles are applied in a liquid fluid, the coating apparatus may further comprise, if needed, a dryer enabling the particle coating to be substantially dry by the time it reaches a subsequent station where such particle layer can be used or subjected to further steps. A dryer can be a blower, a heater, a liquid extractor or any other device suitable to remove surplus liquid. The dryer, if present, is advantageously compatible with the particle layer, and for instance does not negatively affect the particles and/or the integrity of the coating formed of the particles.

The coating apparatus may comprise separate housings enclosing different sub-systems, each housing independently defining an interior plenum or chamber. For example, a first housing of the coating apparatus may comprise a particle supply and an application device; a second housing may contain a first surplus extraction system operative to remove any particles that are not in direct contact with the donor surface; and a second surplus extraction system operative to extract surplus fluid may be contained in a third housing. Additional combinations of sub-systems and options of housing are apparent to the skilled person, and for instance, each housing, if more than one, may have its own surplus fluid extraction system having a suitable suction source. Each housing may have a rim adjacent the surface that is configured to prevent egress of particles from a sealing gap defined between the rim of the housing and the surface being coated.

In the present disclosure, because the particles adhere to the donor surface more strongly than they do to one another, the applied particle coating is substantially a monolayer, i.e. only one particle deep. While some overlap may occur between particles, the layer may be only one particle deep over a major proportion of the area of the surface and most, if not all, of the particles will have at least some direct contact with the surface. The creation of the monolayer occurs for the same reason that an adhesive tape, when used to pick up a powder from a surface, will only pick up one layer of powder particles. When the adhesive tape is fresh, the powder will stick to the adhesive until it covers the entire tape surface. However, once the adhesive has been covered with powder, the tape cannot be used to pick up any more powder because the powder particles will not stick strongly to one another and can simply be brushed off or blown away from the tape. Similarly, the monolayer herein is formed from the particles in sufficient contact with the donor surface and is therefore typically a single particle deep. Contact is considered sufficient when it allows the particle to remain attached to the donor surface at the exit of the coating station, e.g., following surplus extraction, burnishing, or any other like steps which are described in more detail herein.

Taking, for example, a platelet shaped particle contacting the donor surface over most of its planar face (e.g., being substantially parallel), the resulting thickness of the monolayer (in the direction perpendicular to the surface) would approximately correspond to the thickness of the particle, hence the average thickness of the particle coating can be approximated by the average thickness of the individual particles forming it. However, as there could be partial overlaps between adjacent particles, the thickness of the monolayer can also amount, in some places, to a low multiple of the dimension of the constituting particles, depending on the type of overlap, for instance on the relative angles the particles may form with one another and/or with the donor surface and/or the extent of the overlap. A monolayer particle coating may therefore have a maximum thickness corresponding to about one-fold, and only in some regions, of about two-fold, or about three-fold, or any intermediate value, of a thinnest dimension characteristic to the particles involved (e.g., the thickness of the particles for flake shaped ones or essentially the particle diameter for spherical ones). In the present disclosure, such a particle coating is said to be substantially only a single particle deep and is also referred to as a monolayer.

The application device may comprise a spray head, or any other suitable supply system outlet, for spraying the fluid and suspended particles directly onto the surface, or a rotatable applicator operative to wipe the fluid and suspended particles onto the surface. The applicator may for example be a cylindrical sponge or may comprise a plurality of flexible strips extending radially from a rotatable axle. The sponge or the flexible strips may be formed of a closed-cell foam. The fluid comprising the suspended particles may be supplied externally to such an applicator (e.g., the fluid is sprayed on a portion of the applicator typically facing away from the surface) or may be supplied internally (e.g., the fluid is provided from a supply duct or spray positioned within the applicator, for instance, in parallel to the rotatable axis, and diffuse along the material towards the external surface of the applicator).

In some embodiments, the applicator may at least partially remove any particles that are not in direct contact with the surface and optionally at least partially burnish the particles coated on the surface as a monolayer. As used herein, the term "burnish" is to be understood broadly to encompass any flattening action on the particles that may further homogenize at least one property of the particle coating, be it the thickness of the layer, the orientation of the particles, their distribution on the surface, their size, their shine or any other like characteristic. Notably, under certain operating conditions, and depending on the type of particles, the size of the particles can be reduced by one or more elements of the apparatus, in one or more of the steps of the method according to the present teachings.

In some embodiments, the surplus extraction system, that serves to remove any particles that are not in direct contact with the surface, is configured similarly to the applicator, namely as a roller contacting the donor surface or particles thereupon. In such case, the fluid being externally or internally supplied to the applicator-like element to serve as an excess particles remover, would not have any particles suspended in it. The fluid of the surplus extraction system may be the same as, or different from, the fluid in which the particles are suspended for the application device. For instance, particles may be applied while suspended in water or any other aqueous medium, and excess thereof may be removed by the same aqueous medium or by a different fluid, such as by an air stream.

In some embodiments, the applicator-like element of the surplus extraction system removes substantially all particles that are not in direct contact with the surface and optionally at least partially burnishes the particles coated on the surface as a monolayer. Substantial removal may mean that in any monolayer of particles, the proportion of particles of a coating not in direct contact with the donor surface is at most 35%, at most 30%, at most 25%, at most 20%, at most 15%, at most 10%, at most 7%, at most 5%, at most 3%, or at most 2%, by number, of said particles.

In some embodiments, the application device is contained within an interior plenum of a housing that has a rim adjacent the donor surface, the rim being configured to prevent egress of particles from a sealing gap defined between the rim of the housing and the surface.

There are various ways of preventing egress of particles from the housing and of removing surplus particles from the surface to leave only a monolayer. In some embodiments of the apparatus, a wiper member may be provided at least on the upstream side of the housing to prevent fluid escape through the sealing gap during operation of the apparatus.

In some embodiments, a fluid flow passage may be provided at the rim of the housing to enable a fluid to be drawn from, or introduced into, at least regions of the sealing gap disposed downstream of the housing and/or of the coating device. The fluid which may serve to "seal" the apparatus, or any sub-housing, is being introduced or removed from the apparatus by a suction source, and as used herein this term relates to both positive and negative supply of the fluid of relevance.

Optionally, the fluid flow passage may be coupled to the same suction source of a surplus extraction system, or to a second suction source, so as to draw from the gap any fluid that would otherwise escape from the interior plenum through the gap.

As an alternative, the fluid flow passage may be connected to a supply of a gas devoid of suspended particles at above ambient pressure, so that fluid within which the particles are suspended is prevented from escaping from the interior plenum through the gap owing to the pressure in the gap being higher than the pressure in the interior plenum. Such type of confinement can be achieved with an air knife.

The fluid within which the particles are suspended may be a gas, preferably air and in such embodiments particles may be entrained into the gas stream by a Venturi.

Alternatively, the fluid within which the particles are suspended may be a liquid (e.g., water). In such an embodiment, the liquid may be sucked from the surface, so as to leave the particle layer at least partially dry or substantially dry on exiting the apparatus.

In the interest of economy, particles sucked from the interior of the chamber of a housing may be recycled to the supply and/or application device.

The particles may have a flat platelet shape and may be of a coated or uncoated metal, such as aluminum, copper, iron, zinc, nickel, tin, titanium, gold and silver, or alloy, such as steel, brass and bronze, and like compounds predominantly including metals. In addition to being made of real metals, suitable particles can be made of compounds providing for a similar visual effect (e.g., made of a polymeric or ceramic material having a metallic appearance). Such "metal-like" materials are typically predominantly non-metallic, a metal coat optionally serving to provide the light reflectivity that may be perceived as metallic, mica compounds (typically coated with a metal oxide) being but an example of such materials. All such particles can be referred to as "metal-looking" whether made of metallic materials or only having a reflectivity similar to such materials.

The metal-looking flakes can be uncoated, or coated a) with a fatty or oily substance and/or b) with an oxide. Particles suitable for a coating apparatus and method according to the present teachings may for example be coated by one or more of i) an unmodified or modified carboxylic acid or fatty acid, the carboxylic acid selected from the group comprising, but not limited to, stearic acid, palmitic acid, behenic acid, benzoic acid, and oleic acid; ii) an oily substance selected from the group comprising, but not limited to, vegetal oils, such as linseed oil, sunflower oil, palm oil, soya oil, and coconut oil; mineral oils and synthetic oils; and iii) an oxide which may be of same or different material as the core particle being coated. For instance, aluminum particles may be coated with an aluminum oxide or a silicon dioxide and mica particles may be coated with titanium dioxide and iron oxide, for example. The particle coating may optionally modify the coloring effect of the core particle; this being achievable for instance with some metal oxides or with pigmented polymers (e.g., a polyacrylate containing inorganic or organic absorption pigments). Such coloring effect can also result from the choice of the core particle, or from a partial oxidation of the same.

The coating of the particles, which can be applied by physical but more typically chemical means, can, among other things, reduce or prevent the particles sticking to one another (e.g., as achievable with anti-caking agents and the like), increase the repulsion between the particles (e.g., as achievable by increasing the charge of the particles), protect the particles from undesired chemical modification (e.g., reduce, prevent or delay the oxidation of metals and alloys of the metal-looking particles or any other deleterious aging) or further increase the affinity of the particles to the donor surface of the coating apparatus or to the selected regions of a subsequent substrate, as desired (e.g., modify the hydrophobicity of the coats/surfaces).

In certain cases the particles may have a tendency to adhere to the donor surface not only on account of the interaction between two different hydrophobic surfaces but also as a result of a charge based interaction. It may therefore be possible to enhance the affinity between the particles and the donor surface by subjecting the donor surface for a conditioning treatment, such as exposure to a corona discharge or any other method otherwise affecting a charge thereto, or application of a chemical treatment solution.

In order to achieve a shiny surface, if so desired, it is possible for spray head(s) to spray particles onto the carrier member with sufficient force to cause the applied particle coating to be burnished. Alternatively, the particles may be applied by an intermediate applicator, following which they may optionally be further burnished by an optional burnishing device.

It should be mentioned that the side of the particles that is burnished is the side that will ultimately contact the surface of the substrate. The burnishing will ensure that the particle coating is itself very thin and reflective but upon being impressed onto a substrate, the achieved surface finish may depend upon the evenness of the surface of the substrate.

The application device may, in some embodiments, be formed by one or more spray heads aimed directly at the surface to be coated. In such embodiments, the force of the spray will cause a layer of particles to contact the surface, the particles' adhesion thereto being furthered by their respective properties and interactions therebetween. The force of the spray will subsequently dislodge and/or entrain any further particles and prevent them from adhering to the coating layer in direct contact with the surface. This is as a result of the fact that the particles adhere more strongly to the donor surface than they do to one another. The force of the spray may also act to flatten the first layer of the particles against the surface, effectively burnishing the particles, at least partially.

The coating apparatus may further include a dryer to dry the particles coating on leaving the coating apparatus. Such a dryer may be a radiant heater, a hot air or gas blower or a roller that acts as a mop to absorb surplus liquid. Such a roller may, for example, comprise a sponge, made of a closed-cell or open-cell foam, which is squeezed by a pressure bar or roller as it rotates to extract from it liquid mopped from the donor surface.

BRIEF DESCRIPTION OF THE DRAWINGS

Some embodiments of the coating apparatus are described herein with reference to the accompanying drawings. The description, together with the figures, makes apparent to a person having ordinary skill in the art how the teachings of the disclosure may be practiced, by way of non-limiting examples. The figures are for the purpose of illustrative discussion and no attempt is made to show structural details of an embodiment in more detail than is necessary for a fundamental and enabling understanding of the disclosure. For the sake of clarity and simplicity, some objects depicted in the figures are not to scale.

Embodiments of the disclosure will now be described, by way of example, with reference to the accompanying drawings, in which:

DETAILED DESCRIPTION

The coating device will be described herein mainly by reference to its application in digital printing systems however its use is not limited to this application, and different aspects of the invention may be implemented to provide formation of monolayers of particles for any desired purpose.

Overall Description of an Exemplary Printing System

Figure 1:
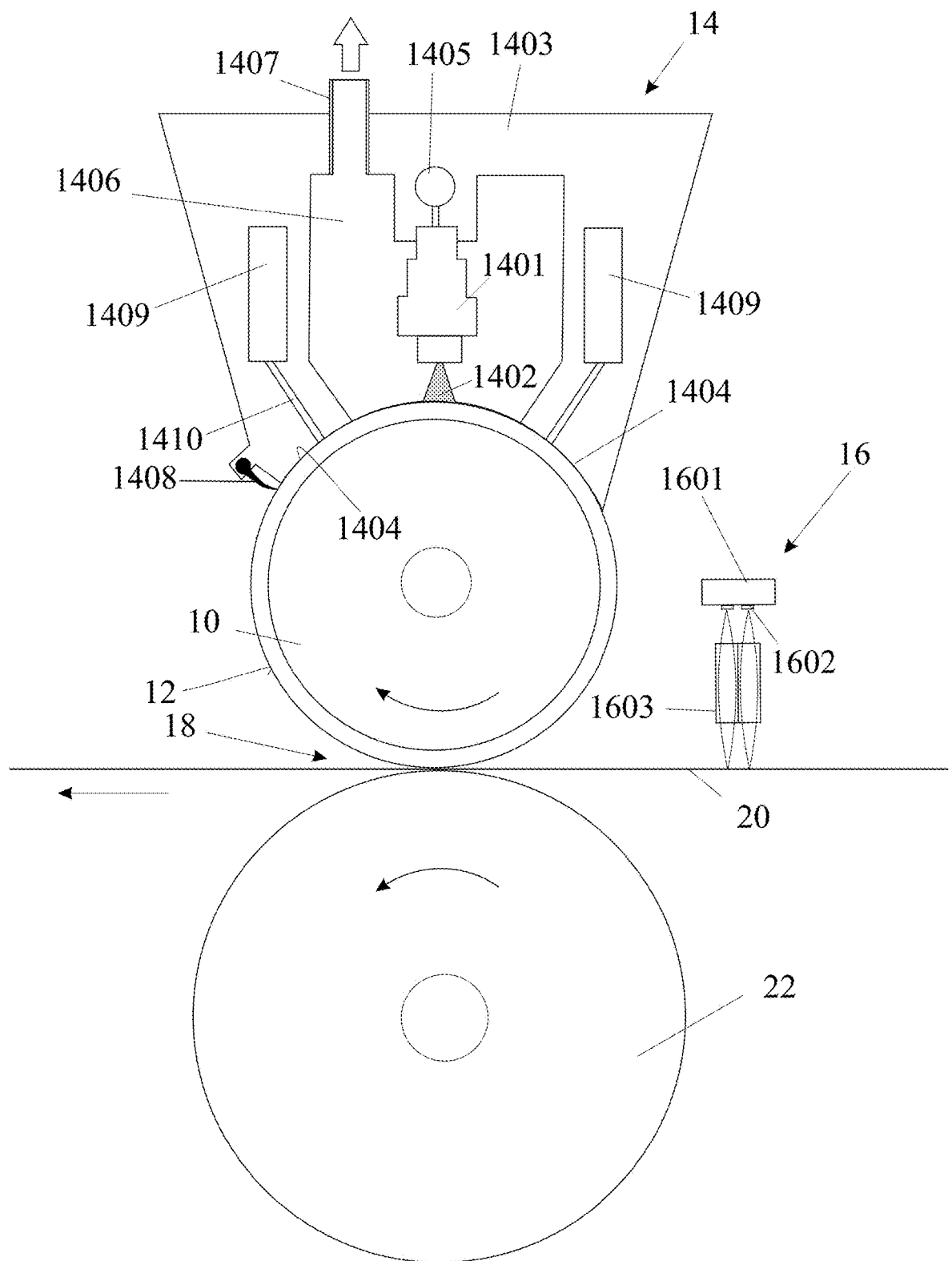
FIG. 1 depicts schematically an embodiment of a printing system incorporating a coating apparatus of the present disclosure.

The particle coating apparatus according to the present disclosure may be used in numerous industrial applications wherein a monolayer of particles is desired for the sought method, use or product. In the following, the particle coating apparatus is described in the context of a printing system, but this needs not be construed as limiting. FIG. 1 shows a drum 10 having an outer surface 12 that serves as a particle carrier member, also termed hereinafter donor surface 12. As the drum rotates clockwise, as represented by an arrow, it passes beneath a coating apparatus 14 where it acquires a monolayer coating of fine particles. After exiting the coating apparatus 14, the donor surface 12 passes beneath an imaging station 16 where, in one embodiment, selected regions of the donor surface 12 are exposed to laser radiation, which renders the particle coating on the selected regions of the surface 12 tacky (as defined below). Next, the surface passes through an impression station 18 where a printing substrate 20 is compressed between the drum 10 and an impression cylinder 22. The pressure applied at the impression station 18 causes the selected regions of the particle coating on the donor surface 12 that have been rendered tacky by exposure to laser radiation in the imaging station 16 to transfer from the donor surface 12 to the substrate 20, or from at least a portion of the donor surface being in such a contact with at least a corresponding portion of the substrate. The regions on the donor surface corresponding to the selected tacky areas transferred to the substrate 20 consequently become exposed, being depleted by the transfer of particles. The donor surface 12 can then complete its cycle by returning to the coating apparatus 14 where a fresh monolayer particle coating is applied only to the exposed regions from which the previously applied particles were transferred to the substrate 20 in the impression station 18.

The terms "tacky" and "sufficiently tacky" as used herein are not intended to mean that the particle coating is necessarily tacky to the touch but only that it has sufficient affinity to be able to adhere to the surface of a substrate when pressed against it in the impression station 18. Similarly, when used in connection with the substrate, the term more broadly relates to the higher affinity of any "tacky" region of the substrate towards the particles, than the bare substrate, said affinity being higher than the affinity of the particles towards the donor surface and sufficient to allow the particles to transfer from the donor surface to such regions during impression.

In the printing system shown in FIG. 1, heat generated by exposure to laser radiation is relied upon to select the regions of the particle coating that are to be transferred to the substrate. In this embodiment, the substrate bears a layer that can be rendered tacky by exposure to radiation. The layer may be formed of an "adhesive", in the common sense of this term, but alternatively it may be a polymer that can be softened by exposure to radiation sufficiently to enable the particles to separate from the donor surface and adhere to the activated regions on the substrate. When incorporated in a system, the location of the coating apparatus may also be referred to as a coating station 14. Laser radiation is given only as an example. Instead of relying on radiation to render selected regions on the substrate tacky, the transfer of the coating to the substrate may take place at the impression station owing to the selective application of pressure, as in foil blocking. Thus the impression cylinder 22 may have an embossed surface or it may carry a stamp or a die.

As a still further alternative, the substrate 20 may have selected regions pre-coated with an adhesive so that particles are only transferred at the impression station to regions of the substrate having an active adhesive coating. The adhesive pre-coating may take place in-line (e.g., an adhesive is selectively deposited in the desired image pattern upstream of the impression station, for instance by printing plates, silk screens or ink jetting) or off-line (e.g., the substrate is fed to the printing system already pre-coated by any of the previously mentioned exemplary methods). The coating apparatus may even be used in a system where transfer takes place over the entire surface of the substrate 20 not just selected regions, in which case pressure may be relied upon to effect the transfer and no embossing need be present on the surface of the impression cylinders 22 or 32, nor any particular pattern on blanket cylinder 30.

The Coating Apparatus

The coating apparatus 14 in the embodiment of FIG. 1 comprises a plurality of spray heads 1401 that are aligned with each other along the axis of the drum 10 and only one is therefore seen in the section of the drawing. The sprays 1402 of the spray heads are confined within a bell housing 1403, of which the lower rim 1404 is shaped to conform closely to the donor surface leaving only a narrow gap between the bell housing 1403 and the drum 10. The spray heads 1401 are connected to a common supply rail 1405 which supplies to the spray heads 1401 a pressurized carrier fluid (gaseous or liquid) having suspended within it the fine particles to be used in coating the donor surface 12. If needed the suspended particles may be regularly or constantly mixed, in particular before their supply to the spray head(s). The particles may be circulated in the coating apparatus at any suitable flow rate, generally not exceeding 50 liter/min, and by way of example within a flow rate range of 0.1 to 10 liter/minute, or in the range of 0.3 to 3 liter/min. The surplus fluid and particles from the sprays heads 1401, which are confined within a plenum 1406 formed by the inner space of the housing 1403, are extracted through an outlet pipe 1407, which is connected to a suitable suction source represented by an arrow, and can be recycled back to the spray heads 1401. Though herein referred to as spray heads, any other type of supply system outlet (e.g., nozzle or orifice) along the common supply pipe or conduit of the supply system, allowing applying the fluid suspended particles, are encompassed.

It is important to be able to achieve an effective seal between the housing 1403 and the donor surface 12, in order to prevent the particle carrying fluid and the fine particles from escaping through the narrow gap that remains between the housing 1403 and the donor surface 12 of the drum 10. Different ways of achieving such a seal are shown schematically in the drawing.

The simplest form of seal is a wiper blade 1408. Such a seal makes physical contact with the donor surface and could score the applied coating if used on the exit side of the housing 1403, that is to say on the side downstream of the spray heads 1401. For this reason, if such a seal is used, it is preferred that it would be located only upstream of the spray heads 1401 and/or at the axial ends of the housing 1403. The terms "upstream" and "downstream" as used herein are referenced to points on the donor surface 12 as it passes or cycles through the coating apparatus.

FIG. 1 also shows how egress of the fluid within which the particles are suspended from the sealing gap between the housing 1403 and the drum 10 can be prevented without a member contacting the donor surface 12. A gallery 1409 extending in the present illustration around the entire circumference of the housing 1403 is connected by a set of fine passages 1410 extending around the entire rim of the housing 1403 to establish fluid communication between the gallery 1409 and the sealing gap.

In a first embodiment, the gallery 1409 is connected to a suction source of a surplus extraction system, which may be the same suction source as is connected to the outlet 1407 or a different one. In this case, the gallery 1409 serves to extract fluid passing through the gap before it exits the housing 1403. The low pressure also sucks off the drum 10 any particles that are not in direct contact with the donor surface 12 and, if the sprayed fluid is a liquid, it also sucks off surplus liquid to at least partially dry the coating before it leaves the coating apparatus 14.

Figure 4:
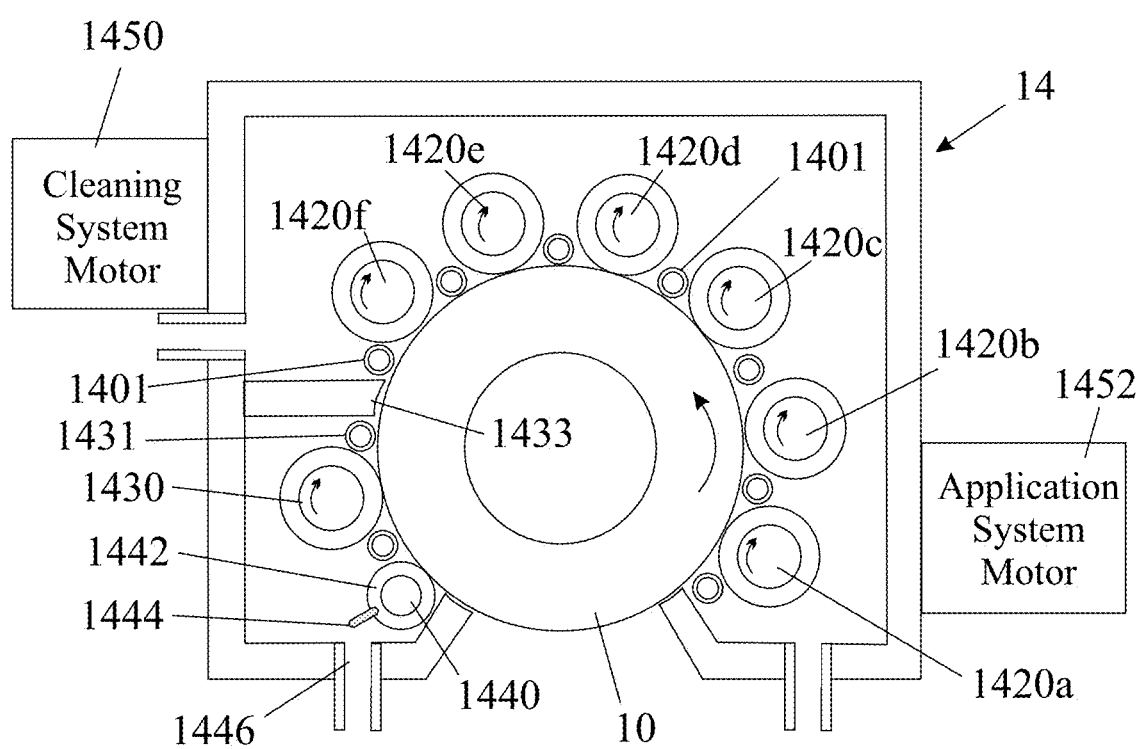
FIG. 4 is a view similar to that of FIGS. 1 and 2 but showing an alternative embodiment of the coating apparatus.

Surplus liquid can alternatively and additionally be removed by a liquid extracting roller positioned on the exit side of the coating apparatus. Such a roller is shown in the embodiment of FIG. 4 in which it is designated 1440. The outer surface 1442 of the roller 1440 has sponge-like liquid absorbing properties (e.g., closed-cell foam), and can be independently driven to rotate at a speed and/or in a direction differing from the speed and direction of drum 10. The liquid extracting roller can contact the particles coated on the donor surface 12 and extract surplus liquid by drawing it within its fluid absorbing outer surface 1442, advantageously sufficiently smooth and even, so as not to affect the layer of particles retained on the donor surface prior to their selective transfer to the substrate 20. As the extracting roller 1440 continues to rotate following the absorption of the surplus liquid, it approaches a wiper 1444, or any other suitable structure, positioned so as to squeeze the roller or otherwise release the extracted liquid out of its absorbing surface. A suction outlet 1446 can be positioned adjacent to such wiper or replace the wiper, so as to permit the immediate removal of the liquid so extracted from the particle coated donor surface and so forced out of the roller outer surface. Following such elimination of the removed liquid, the roller 1440 can complete its cycle, contacting again the donor surface and further extracting surplus liquid. Though illustrated in FIG. 4 as being internal to a coating station 14, a liquid extracting roller 1440, if present, can alternatively be positioned downstream of the coating station, as long as it remains upstream of a station where the particle coating needs to be substantially dry. The liquid extracting element, if present, is advantageously compatible with the particle layer, and for instance does not negatively affect the particles and/or the integrity of the layer formed therefrom.

The printing system may further or alternatively comprise a dryer (e.g., hot or cold air blower) on the exit side of the coating apparatus 14, or further downstream, so as to allow the particle coat to reach a subsequent station in substantially dry form. The drying element, if present, is advantageously compatible with the particle layer, and for instance does not negatively affect the particles and/or the integrity of the layer formed therefrom.

In an alternative embodiment, the gallery 1409 is connected to a source of gas at a pressure higher than the pressure in the plenum 1406. Depending on the rate of fluid supply to the plenum through the spray heads 1401, or other particle supply method, and the rate of extraction through the outlet 1407, the plenum 1406 may be at a pressure either above or below the ambient atmospheric pressure.

If the plenum is maintained at sub-atmospheric pressure, then it suffices for the gallery 1409 to be at ambient atmospheric pressure, or the gallery may be omitted altogether. In this case, because the pressure within the sealing gap will exceed the pressure in the plenum 1406, gas flow through the gap will be towards the interior of the housing with no risk of fluid egress.

If the plenum is at above ambient pressure, then the gallery 1409 may be connected to a gas supply, preferably air, that is pressurized at higher pressure than the plenum pressure. In this case, air will be forced into the sealing gap under pressure through the passages 1410 and will split into two streams. One stream will flow towards the plenum 1406 and will prevent egress of the fluid within which the particles are suspended. That stream will also dislodge and/or entrain particles not in direct contact with the donor surface and assist in at least partially drying the coating if the carrier fluid is a liquid. The second stream will escape from the coating apparatus without presenting a problem as it is only clean air without any suspended particles. The second gas stream may also assist in further drying of the particle coating on the donor surface 12 before it leaves the coating apparatus 14. If desired, the gas stream can be heated to facilitate such drying.

In an alternative embodiment, the afore-mentioned gallery 1409 does not extend around the entire circumference of the housing, so as to seal the plenum 1406 on all sides. It can be a "partial" gallery or a combination of one or more air knives (with negative or positive flow) positioned either downstream or upstream of the spray head(s) and/or intermediate applicator(s) in parallel to the axis of the drum and/or on the lateral edges of the spray heads and/or applicators in a direction perpendicular to the axis of the drum. A "partial" gallery on the exit side may, in some embodiments, serve as gas blower (e.g., cold or hot air) additionally or alternatively facilitating the drying of the particles, in which case the passages 1410 may be dimensioned to provide sufficient flow rate.

Figure 2:
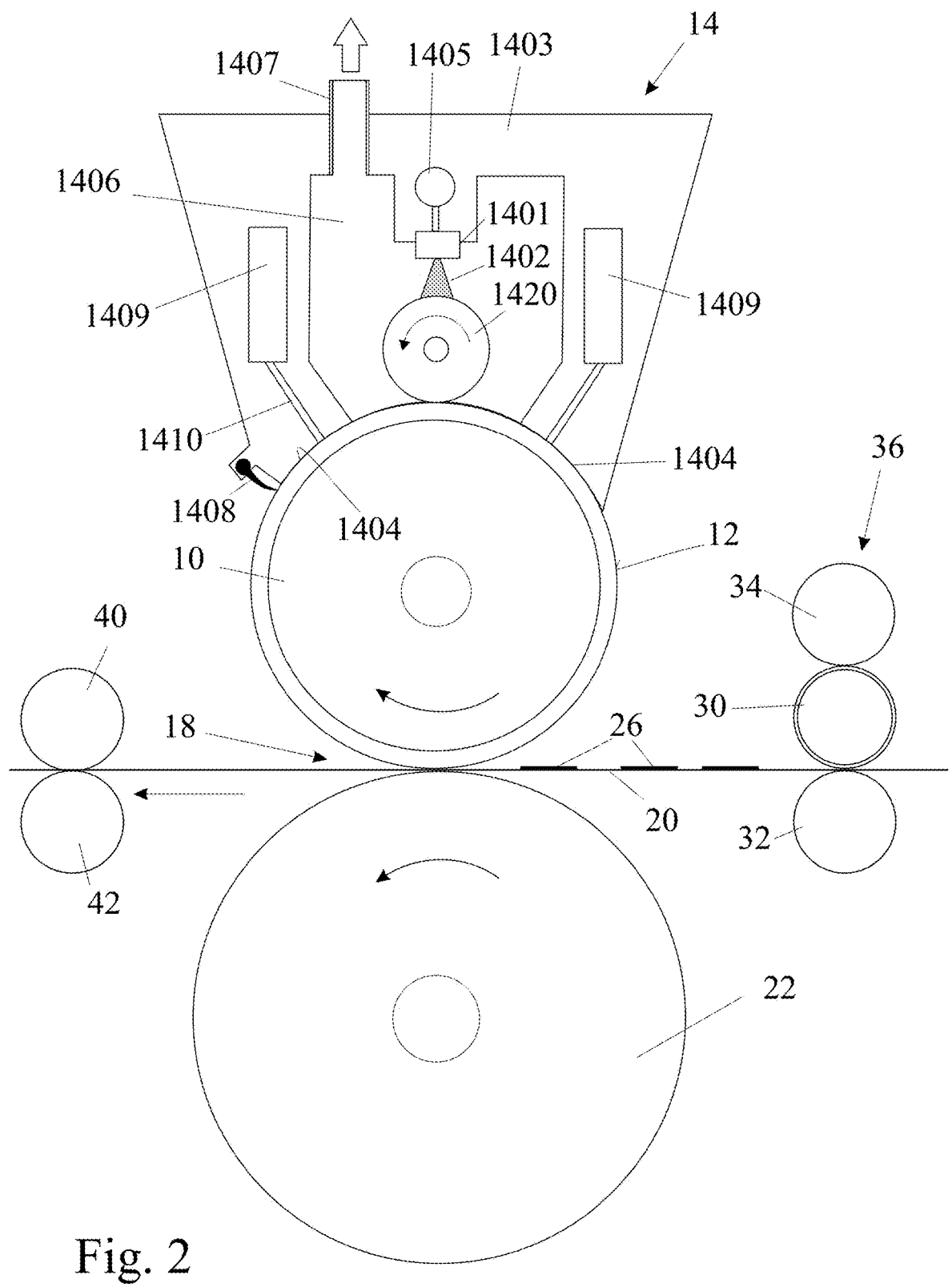
FIG. 2 is a view similar to that of FIG. 1 showing an embodiment having an alternative application device.

In the embodiment illustrated in FIG. 2, instead of being carried in a fluid sprayed directly onto the donor surface 12, the suspended particles are applied by spray heads 1401 to an intermediate applicator 1420. The applicator 1420 may be for example a sponge-like roller, of which the axis is parallel to the axis of drum 10. The fluid and suspended particles may be sprayed onto the applicator 1420 in the manner shown in FIG. 2, or if the applicator is porous, or constructed in manner similar to the "brushes" used in automatic car washes that have loose fabric strips extending radially from a central axle, then the fluid may be introduced via the axle hub and allowed to escape through holes in the axle (not shown). The material of the roller or the fabric strip is to be "relatively soft", selected so as to wipe the particles on the donor surface, without affecting the integrity of the coat thereupon formed, in other words without scratching the layer of particles. The surface of the applicator, or of its bristles or stripes, may suitably comprise a closed-cell foam (such as such as closed-cell polyethylene, closed-cell PVA or closed-cell silicone); or a relatively soft open-cell foam (such as a polyurethane foam); or a fabric, such as cotton, silk or ultra high molecular weight polyethylene (UHM-WPE) fabric.

As the roller or brush 1420 rotates along its axis, it applies the particles upon contact with donor surface 12 of drum 10. The outer surface of the applicator 1420 need not have the same linear velocity as the donor surface and it can, by way of example, be up to about ten-fold higher. It may rotate in the same direction as drum 10 or in counter-direction. The applicator may be independently driven by a motor (not shown in FIG. 2) or driven by drum 10 by gears, belts, friction, and the like.

FIG. 4 shows an embodiment in which the particle coating apparatus 14 comprises more than one applicator 1420 of particles. FIG. 4 shows six such applicators 1420a to 1420f but there may be fewer or more. In FIG. 4, each of the applicators 1420a to 1420f has its own supply of particles as applied by sprays provided by spray heads 1401, the relevant fluid being delivered by a supply conduct. It is alternatively possible to have two or more applicators having a common supply system or set of supply system outlets. Such applicator(s) may optionally provide some burnishing or flattening of the particles on the donor surface, or such function, if desired, can be provided by a separate element, as described below.

Figure 3:
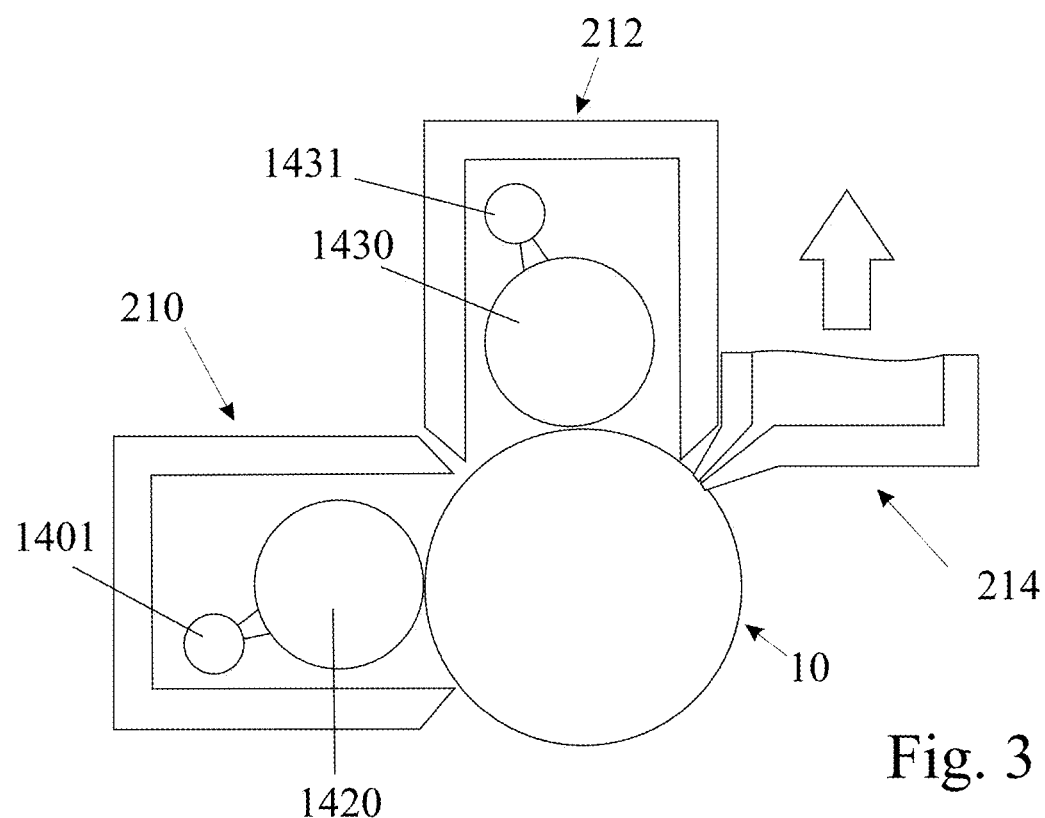
FIG. 3 shows an embodiment in which particle application, cleaning and drying are carried out in three separate housings.

As schematically illustrated in FIGS. 3 and 4, the coating apparatus can further comprise a cleaning roller 1430. A cleaning roller can be similar in structure to an applicator roller 1420, except that it would lack the supply of particles. The cleaning roller applies a liquid supplied by a spray head 1431 that can correspond to the fluid carrier of the particles, but devoid of particles, or to any other suitable fluid.

As shown in FIG. 4, the compartment of the housing of the coating apparatus 14 containing the cleaning roller 1430 is separated from the remainder of the housing by an air knife 1433 so that the fluid present in the cleaning compartment and containing no particles does not mix with the fluid in the remainder of the housing. Separate extraction points 1446 are provided so that the two fluids can also be separately processed and returned to their respective spray heads. A second air knife may be provided at the exit ends of the cleaning compartment.

As an alternative to incorporating a cleaning roller within the coating apparatus 14, it is possible, as shown in FIG. 3, for it is may be positioned externally to the housing of the particles applicator(s), optionally in a separate housing with a distinct fluid supply and system for elimination and/or recirculation. In FIG. 3, which is described in greater detail below, three separate housings 210, 212 and 214 contain a coating station, a cleaning station and a drying station, respectively.

A cleaning device, if present, can be continuously operated. For instance, a cleaning roller as above-exemplified may serve to remove particles not in direct contact with the donor surface during any cycle of the surface in the coating station during operation of the system in which an apparatus as herein disclosed can be integrated. Additionally, and alternatively, a cleaning device can be used periodically. Such a cleaning device may for instance be used for maintenance, and can serve to remove all particles from the entire donor surface. Such complete regeneration of the donor surface to be free of particles can be done intermittently or periodically, for example in the context of a printing system at the end of a print job, or when changing the particles to be printed (e.g., to a new batch or to a new type), or once a day, or once a week, or any other desired frequency. Periodical cleaning devices, which may rely on chemical or physical treatment of the donor surface achieving full particle removal, can be located externally to the coating station. They can be operated for at least one cycle of the donor surface. For this reason, the embodiment of FIG. 4 has separate motors 1450 and 1452 of driving the cleaning rollers(s) and the applicator roller(s), respectively.

The Particles

The particles may be made of any metallic or metal-looking material and have any shapes and/or dimensions suitable to provide for sufficient contact area with the donor surface, at least over a time period the particle coating is desired.

The shape and composition of the coating particle will depend in practice on the intended use of the layer of particles, and in the context of a non-limiting example of a printing system, on the nature of the effect to be applied to the surface of the substrate 20. In a printing system, the particles may conveniently be formed of a pigmented polymer. For printing of high quality, it is desirable for the particles to be as fine as possible to minimize the interstices between particles of the applied monolayer coating. The particle size is dependent upon the desired image resolution and for some applications a particle size (e.g., a diameter or maximum long dimension) of 10 μm (micrometers) or possibly even more (i.e. having a larger size) may prove adequate. Considering for example globular pigmented polymers, an average diameter between 100 nm and 4 μm, or even between 500 nm and 1.5 μm can be satisfactory. For irregular platelets, the longest dimension may even reach 100 μm on average. However, for improved image quality, it is preferred for the particle size to be a small fraction or a fraction of a micrometer and more preferably a few tens or hundreds of nanometers. Commercially available flakes may have a thickness of about 60-900 nm and a representative planar dimension (e.g., mean diameter for near round flakes or average "equivalent diameter" for platelets having less regular plane projection, also characterized by shortest/longest dimensions) of about 1-5 μm, but flakes can also be prepared with a thickness of as little as 15 nm, 20 nm, 25 nm, 30 nm, 40 nm, or 50 nm and a mean or equivalent diameter in the region of 100-1000 nm or 500-800 nm. It is believed that over most of the practical size range, the smaller the particle size, the greater is the degree of shine that can be achieved and the closer the approximation of a mirror-like finish when such particles have substantially the same orientation (e.g., when flake-like particles are to a large extent aligned with one another so as to form a relatively even surface enhancing specular light reflection) and/or a more parallel orientation with the printing substrate. However, the size of the particles need not be too small, since below a certain threshold, which typically depends on the chemical and/or physical nature of the particles, the particles may display undesired edge effects rendering them less suitable to the intended printing.

Thus particle selection and ideal size determination, will depend upon the intended use of the particles, the effect sought (e.g., visual effect in the case of printing; conductive effect in the case of electronics, etc.), and the operating conditions of the relevant system in which a coating apparatus according to the present teachings is to be integrated. Optimization of the parameters, may be done empirically, by routine experimentation, by one of ordinary skill in the art.

Depending on their shape, which can be relatively regular or irregular, the particles may be characterized by their length, width, thickness, mean or equivalent diameter or any such representative measurement of their X-, Y- and Z-dimensions. Generally the dimensions of the particles are assessed on planar projections of their shape (e.g., vertical and/or horizontal projections). Typically such sizes are provided as average of the population of particles and can be determined by any technique known in the art, such as microscopy and Dynamic Light Scattering (DLS). In DLS techniques the particles are approximated to spheres of equivalent behavior and the size can be provided in terms of hydrodynamic diameter. DLS also allows assessing the size distribution of a population. As used herein, particles having a size of, for instance, 10 µm or less, have at least one dimension smaller than 10 µm, and possibly two or even three dimensions, depending on shape. The particles are said to fulfill on average any desired size preference, if the D50 (50% of the population, e.g., by number or volume of particles) is about the intended size; whereas a population of particles wherein the D90 (e.g., $D_N90$, $D_V90$) is about the intended size implies a vast majority of particles (90% of the population) satisfy the same.

The particles may have any suitable aspect ratio, i.e., a dimensionless ratio between the smallest dimension of the particle and the equivalent diameter in the largest plane orthogonal to the smallest dimension. The equivalent diameter can be for instance the arithmetical average between the longest and shortest dimensions of that largest orthogonal plane. Such dimensions are generally provided by the suppliers of such particles and can be assessed on a number of representative particles by methods known in the art, such as microscopy, including in particular by scanning electron microscope SEM (preferably for the planar dimensions) and by focused ion beam FIB (preferably for the thickness and length (long) dimensions). Such characteristic dimensions can be quantitatively determined for each individual particle or for a group of particles, for instance the entire field of view of an image captured at relevant magnification.

Particles having an almost spherical shape are characterized by an individual aspect ratio (or an average aspect ratio if considering a population of particles) of approximately 1:1 and typically no more than 2:1. Depending on the technique used for the determination of the characteristic dimensions of a particle, the average for a group of particles may be volume-averaged, surface-area averaged, or number averaged.

For simplicity, individual and average aspect ratio are hereinafter referred to as "aspect ratio" the population size being clear from context. While ball-like particles have an aspect ratio of about 1:1, flake-like particles can have an aspect ratio of 100:1 or more. Though not limiting, the particles suitable for a coating apparatus according to the present teachings can have an aspect ratio of about 100:1 or less, of about 75:1 or less, of about 50:1 or less, of about 25:1 or less, of about 10:1 or less, or even of about 2:1 or less. In some embodiments, the particles suitable for the present teachings may have an aspect ratio of at least 2:1, at least 3:1, at least 5:1, at least 10:1, at least 25:1, at least 40:1, or at least 70:1.

Though not essential, the particles may preferably be uniformly shaped and/or within a symmetrical distribution relative to a median value of the population and/or within a relatively narrow size distribution.

A particle size distribution is said to be relatively narrow if at least one of the two following conditions applies:
A) the difference between the hydrodynamic diameter of 90% of the particles and the hydrodynamic diameter of 10% of the particles is equal to or less than 150 nm, or equal to or less than 100 nm, or equal to or less than 50 nm, which can be mathematically expressed by: (D90−D10)≤150 nm and so on; and/or
B) the ratio between a) the difference between the hydrodynamic diameter of 90% of the particles and the hydrodynamic diameter of 10% of the particles; and b) the hydrodynamic diameter of 50% of the particles; is no more than 2.0, or no more than 1.5, or no more than 1.0, which can be mathematically expressed by: (D90−D10)/D50≤2.0 and so on.

D10, D50 and D90 can be assessed by number of particles in the population, in which case they may be provided as $D_N10$, $D_N50$ and $D_N90$, or by volume of particles, in which case they may be provided as $D_V10$, $D_V50$ and $D_V90$.

As mentioned, such relatively uniform distribution may not be necessary for certain applications. For instance, having a relatively heterogeneously sized population of particles may allow relatively smaller particles to reside in interstices formed by relatively larger particles.

Depending on their composition and/or on the processes they undergo (e.g., milling, recycling, burnishing, etc.), the particles can be hydrophobic with different degrees, if any, of hydrophilicity. As the balance between the hydrophobic and hydrophilic nature of the particles may shift with time, the coating process is expected to remain efficient if the hydrophobic nature of the particles predominates. Additionally, the particles may be made of materials intrinsically hydrophilic, in which case they can be rendered hydrophobic by application of a particle coating. Materials suitable for such a particle coating can have a hydrophilic end with affinity to the particle (e.g., a carboxylic function affine to a metal oxide) and a hydrophobic tail. In the present disclosure such particles, whether intrinsically hydrophobic or coated to become hydrophobic or more hydrophobic, are said to be substantially hydrophobic.

The particles can be carried by either a gaseous or a liquid fluid when they are sprayed onto the donor surface or upon the intermediate applicator(s). When the particles are suspended in a liquid, in order both to reduce cost and minimize environmental pollution, it is desirable for the liquid to be aqueous. In such a case, it is desirable for the polymer or material used to form or coat the particles to be hydrophobic. Hydrophobic particles more readily separate from an aqueous carrier, facilitating their tendency to attach to and coat the donor surface. Such preferential affinity of the particles towards the surface of the coating device, rather than towards their fluid carrier and towards one another, is deemed particularly advantageous. Blowing a gas stream over the particle coating (which as mentioned can preferably be formed by hydrophobic particles on a hydrophobic donor surface) will both serve to dislodge and/or entrain particles not in direct contact with the donor surface and to at least partially dry the particle coating on the donor surface.

While in the above coating step, the preferential affinity of the particles is to the donor surface, the particles need to be compatible with their subsequent transfer. Taking for instance a printing application in which the particles would be transferred from the donor surface to a printing substrate, then the relative affinity of the particles at an impression station would "shift" from the donor surface to the substrate. This can be viewed as a "gradient of affinities", the particles having greater affinity to the donor surface than to one another, and the substrate having greater affinity to the particles, than the particles to the donor surface. Such gradient can be obtained as above-exemplified through hydrophobic properties of all interfaces involved, but can also be facilitated or further tailored by reliance on additional types of interactions. For instance, the particles, the donor surface, and the surface of relevance to any subsequent step, can each have a gradient of charges, instead or in addition to a gradient of hydrophobicity.

If desired, it is optionally possible to apply to the substrate 20 an effect similar to foil blocking, the particles are, as mentioned, metallic or metal-looking (e.g., made of a polymeric or ceramic material having a metallic appearance) and may be coated or uncoated. Because of the manner in which such particles are produced (commonly by milling), they tend to be flat platelets and though not essential this enables highly reflective coatings of near mirror quality to be achieved when the particles have light reflective surfaces and their planar dimension are substantially aligned with the donor surface or with any other substrate to which they can be transferred. Such particles lend themselves to burnishing, which may be carried our either by the use of high pressure during the spraying or by means of a burnishing roller, such as the optional roller 40 and counter roller 42 shown in FIG. 2.

In addition, or as an alternative, to burnishing the particle layer after it has been transferred to the substrate, it is possible to burnish or polish the particle coating while it is still on the donor surface 12. Thus, a burnishing roller or other wiping element may be positioned immediately downstream or as part of the coating apparatus 14.

Burnishing may be carried out with a dry roller or with a wet roller (e.g., impregnated and/or washed with the fluid on which the particles are suspended, for instance water). In the event an intermediate applicator being used, it may itself, in addition to applying the particles to the surface, act to burnish them partly.

It is believed that during burnishing the size of the particles is reduced as compared to their original size upon initial injection into the coating apparatus and application upon the donor surface, and that, alternatively and additionally, the burnished particles are oriented in a substantially parallel manner with respect to the donor surface of the drum and/or more evenly distributed on the surface.

Figure 5:
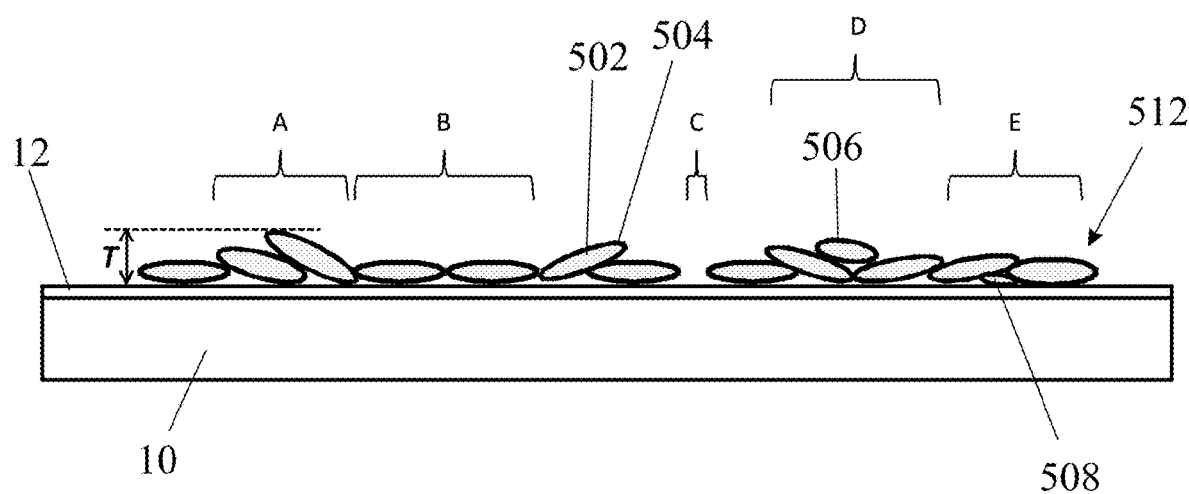
FIG. 5 is a schematic section through a donor surface coated with platelet-like particles.

A layer of particles 512 that may be obtained by the coating apparatus described hereinabove, is schematically illustrated in the cross-section along the x-y plane presented in FIG. 5. While particles 502, having an outer surface 504, are illustrated as having an elongated cross-sectional shape (e.g., corresponding to a platelet like particle), this should not be construed as limiting. Particles 502 are positioned on top of a donor surface 12, itself forming the outer surface of drum 10 or of any other physical support allowing for the relative displacement of the donor surface 12 with respect to the coating apparatus 14. As previously explained, the surfaces 504 of particles 502 can be hydrophobic. In FIG. 5, several particles are shown to be partially overlapping, see section A, such overlap yielding an overall particle layer thickness denoted as T. In section B, the particles are illustrated as being contiguous, whereas section C points to a gap between neighboring particles. In section D, a particle 506 is shown as having no contact with the donor surface, as appearing in the present x-y-cross section. However, such an overlapping particle may be positioned over the particles contacting the underneath layer such that it could conceivably contact the donor surface at another point (not shown) along the z-direction. In section E, a particle 508 is shown as being overlapped by more than one adjacent particle.

Alternative Configuration of Coating Stations

FIG. 3 shows very schematically an embodiment that has three stations 210, 212 and 214 spaced circumferentially around the drum 10. Each of the stations 210 and 212 is constructed in substantially the same way as the coating apparatus 14 in FIG. 2. The station 210 applies particles to the surface of the drum 10 and can be referred to as an application station. The station 212 is a first surplus extraction station able to remove particles applied in excess at station 210, namely particles which are not in direct contact with the donor surface and thus not strongly bond to it. At this station the liquid applied to the applicator does not have any particles suspended in it and the applicator, used mainly to remove loosely bond excess particles, may also serve, if desired, to at least partially burnish the particles applied in the station 210. For simplicity, and to differentiate from subsequent station, station 212 may be referred to as the cleaning or burnishing station, even though this particular use can be optional. Lastly, the station 214 forms a second part of the surplus extraction system and acts to at least partially dry the surface of the drum 10 and to remove from it any residual excess particles that were not eliminated at station 212. As mentioned, though the direction of the arrow illustrates removal by negative suction, a similar confinement of any surplus due to remain in the apparatus can be achieved by the supply of a positive air flow at the exit side (e.g., air knife).

Though each of the afore-mentioned stations is described by its predominant function in such a configuration of the coating apparatus, it is to be noted that they may fulfill additional function of the coating apparatus. For instance, though station 214 predominantly acts as part of the surplus extraction system, other stations 210 and 212 may also be capable of at least partially extracting surplus fluid and/or particles.

Though in the previously described sub-station configuration of the coating apparatus, each type of station is mentioned once, this need not necessarily be the case. For instance, there can be two burnishing stations, were such function be desirable for the intended particles and use of the coating apparatus.

Burnishing is of particular advantage when operating the spray head(s) of the coating apparatus at relative low pressure and/or when including an intermediate applicator. Though shown as forming part of a separate station in FIG. 3, a burnishing roller (not shown) may be incorporated into the housing of the coating apparatus as illustrated in FIGS. 1 and 2. Burnishing of the monolayer of particles (e.g., metallic platelets) is advantageously carried out, when desired, before the coating reaches the impression station, but this need not necessarily be the case as some printing systems may benefit from burnishing of the particles following their transfer to the substrate. Burnishing may be carried out with a dry roller or with a wet roller (e.g., impregnated and/or washed with the fluid in which the particles are suspended, for instance water). In the event an intermediate applicator is used, it may in addition to applying the particles to the surface also act to partly burnish them.

The outer surface of the optional burnishing roller may rotate at a linear speed different than that of the donor surface of the drum and/or of the outer surface of an intermediate applicator, if present. It can rotate in the same or counter-direction relative to the drum.

The Particle Carrier

The particle carrier, that is to say the fluid within which the particles are suspended, may be either a liquid or a gas. If liquid, the carrier is preferably water based and if gaseous the carrier is preferably air. The particles may be lyophobic (i.e., having no affinity) with respect to their carrier, for instance may be hydrophobic, while the carrier is an aqueous liquid. Such may result in particles being partly dispersed in the liquid, and partly phase separated (all types of such mixtures of materials of same or different phases being herein encompassed by the term "suspended"). In addition to the particles, the carrier may comprise any additive known in the art of particle formulation, such as dispersants, surfactants, water-miscible solvents, co-solvents, stabilizers, preservatives, viscosity modifiers, pH modifiers, and the like. All such additives and their typical concentrations are known to persons skilled in the art of dispersions and need not be further detailed herein. Additives (or mixtures thereof) not affecting the hydrophobicity of the particles and of the donor surface are preferred. Such agents, in particular the dispersing agents, may assist in maintaining or increasing the stability of the suspended particles in the liquid (including in phase separated form, if desired). The liquid carrier may also comprise excess of unbound material serving as particle coat, if desired when applicable. Any such additive and mix thereof, preferably should not affect the overall inertness of the liquid carrier towards the donor surface (e.g., avoiding or reducing any deleterious swelling of the surface that would prevent proper coating by attachment of the particles).

A liquid carrier is said to be aqueous if it contains at least 80 wt. % water (i.e., 80% by weight of the total composition), or at least 85 wt. %, or at least 90 wt. %, or at least even 95 wt. % water. It is to be understood that though final work aqueous compositions comprising the particles may predominantly contain water, as previously mentioned, it is possible to prepare intermediate aqueous compositions containing a higher amount of solid particles (and additives if any) and lower amount of water. Such intermediate compositions may serve as concentrates, which can be diluted to desired working concentrations when needed, but stored and/or shipped in smaller volumes. A concentrate may for instance comprise as much as about 80 wt. % of solids and about 20 wt. % of a water miscible co-solvent, the water being added during dilution of the concentrate.

A liquid carrier does not wet a donor surface if the wetting angle it may form on such surface exceeds 90°, as further explained hereinbelow.

The Donor Surface

The donor surface 12 in some embodiments is a hydrophobic surface, made typically of an elastomer that can be tailored to have properties as herein disclosed, generally prepared from a silicone-based material. Poly(dimethylsiloxane) polymers, which are silicone-based, have been found suitable. In one embodiment, a fluid curable composition was formulated by combining three silicone-based polymers: a vinyl-terminated polydimethylsiloxane 5000 cSt (DMS V35, Gelest®, CAS No. 68083-19-2) in an amount of about 44.8% by weight of the total composition (wt. %), a vinyl functional polydimethyl siloxane containing both terminal and pendant vinyl groups (Polymer XP RV 5000, Evonik® Hanse, CAS No. 68083-18-1) in an amount of about 19.2 wt. %, and a branched structure vinyl functional polydimethyl-siloxane (VQM Resin-146, Gelest®, CAS No. 68584-83-8) in an amount of about 25.6 wt. %. To the mixture of the vinyl functional polydimethyl siloxanes were added: a platinum catalyst, such as a platinum divinyltetramethyldisiloxane complex (SIP 6831.2, Gelest®, CAS No. 68478-92-2) in an amount of about 0.1 wt. %, an inhibitor to better control curing conditions, Inhibitor 600 of Evonik® Hanse, in an amount of about 2.6 wt. %, and finally a reactive cross-linker, such as a methyl-hydrosiloxane-dimethylsiloxane copolymer (HMS 301, Gelest®, CAS No. 68037-59-2) in an amount of about 7.7 wt. %, which initiates the addition curing. This addition curable composition was shortly thereafter applied with a smooth leveling knife upon the support of the donor surface (e.g., an epoxy sleeve mountable on drum 10), such support being optionally treated (e.g., by corona or with a priming substance) to further the adherence of the donor surface material to its support. The applied fluid was cured for two hours at 100-120° C. in a ventilated oven so as to form a donor surface.

The hydrophobicity is to enable the particles' monolayer contacted with the selectively tacky adhesive bearing substrate to transfer cleanly to the substrate without splitting.

The donor surface is preferably hydrophobic, that is to say the wetting angle with the aqueous carrier of the particles exceeds 90°. The wetting angle is the angle formed by the meniscus at the liquid/air/solid interface and if it exceeds 90°, the water tends to bead and does not wet, and therefore adhere, to the surface. The wetting angle or equilibrium contact angle $\Theta_0$, which is comprised between and can be calculated from the receding (minimal) contact angle $\Theta_R$ and the advancing (maximal) contact angle $\Theta_A$, can be assessed at a given temperature and pressure of relevance to the operational conditions of the coating process. It is conventionally measured with a goniometer or a drop shape analyzer through a drop of liquid having a volume of 5 µl, where the liquid-vapor interface meets the donor surface, at ambient temperature (circa 23° C.) and pressure (circa 100 kPa).

Such measurements were performed with a Contact Angle analyzer—Krüss™ "Easy Drop" FM40Mk2 using distilled water as reference liquid on a sample of silicon-based donor surface prepared as above described, the sample having a size of 2 cm×2 cm. The results were analyzed using "Drop shape analysis" program, circle computer method, the advancing contact angle $\Theta_A$ of the above-described donor surface was found to be 101.7°±0.8° and the receding contact angle $\Theta_R$ was found to be 99.9°±3.1°. Typically, donor surfaces prepared by this method had contact angles in the range of about 95° to about 115°, generally not exceeding 110°, and any elastomer providing for such contact angles, hence hydrophobicity, are expected to be suitable, as long as compatible with the particles to be applied thereon.

This hydrophobicity may be an inherent property of the polymer forming the donor surface or may be enhanced by inclusion of hydrophobicity additives in the polymer composition. Additives that may promote the hydrophobicity of a polymeric composition may be, for example, oils (e.g., synthetic, natural, plant or mineral oils), waxes, plasticizers and silicone additives. Such hydrophobicity additives can be compatible with any polymeric material, as long as their respective chemical nature or amounts do not prevent proper formation of the donor surface, and for instance would not impair adequate curing of the polymeric material.

Alternatively, and optionally additionally to hydrophobic-hydrophobic interactions, the relative affinity of the particles to the donor surface can be facilitated by each having opposite charges. For instance, a silicone based elastomer can have negative charge while the particles can be positively charged. The donor surface can therefore have any charge that would be compatible with the intended particles.

Advantageously any said charge, if tailored and not inherent to the materials forming the surface, is also suitable for the subsequent selective release and transfer of the particles to a substrate of relevance. As above-explained, a variety of such gradient of properties can be suitable and can be tailored by one of ordinary skill in the art of the intended use.

The roughness or finish of the donor surface will be replicated by the layer of particles, and can be adapted to the intended use of the coating apparatus. By way of example, if the apparatus is used in a system for printing a metallised surface using metal-looking particles having reflective properties, it is understood that a mirror finish or highly glossy appearance requires the donor surface to be smoother than if a matte or satin look is desired.

The donor surface 12 may have any Shore hardness suitable to provide a strong bond to the particles when they are applied using the coating apparatus 14, the bond being stronger than the tendency of the particles to adhere to one another. The hardness of the silicone-based surface may vary and for instance depend on the thickness of the donor surface and/or the particles intended to be bond. It is believed that for relatively thin donor surfaces (e.g., 100 µm or less), the silicone-based material may have a medium to low hardness; whereas for relatively thick donor surfaces (e.g., up to about 1 mm), the silicone-based material may have a relatively high hardness. Additionally, larger particles may typically benefit from a donor surface having a lower hardness than necessary to accommodate relatively smaller particles. In some embodiments, a relatively high hardness between about 60 Shore A and about 80 Shore A is suitable for the donor surface. In other embodiments, a medium-low hardness of less than 60, 50, 40, 30, 20 or even 10 Shore A is satisfactory. In a particular embodiment, the donor surface has a hardness of about 30-40 Shore A.

The donor surface 12 in the drawings is the outer surface of a drum 10, which can be either directly cast thereupon or mounted as a sleeve separately manufactured. This, however, is not essential as it may alternatively be the surface of an endless transfer member having the form of a belt guided over guide rollers and maintained under an appropriate tension at least while it is passing through the coating apparatus. Additional architectures may allow the donor surface 12 and the coating station 14 to be in relative movement one with the other. For instance, the donor surface may form a movable plan which can repeatedly pass beneath a static coating station, or form a static plan, the coating station repeatedly moving from one edge of the plan to the other so as to entirely cover the donor surface with particles. Conceivably, both the donor surface and the coating station may be moving with respect to one another and with respect to a static point in space so as to reduce the time it may take to achieve entire coating of the donor surface with the particles dispensed by the coating station. All such forms of donor surfaces can be said to be movable (e.g., rotatably, cyclically, endlessly, repeatedly movable or the like) with respect to the coating station where any such donor surface can be coated with particles (or replenished with particles in exposed regions).

The donor surface may additionally address practical or particular considerations resulting from the specific architecture of a system in which such a coating station can be integrated. For instance, the donor surface can be flexible enough to be mounted on a drum, have sufficient abrasion resistance, be inert to the particles and/or fluids being employed, and/or be resistant to any operating condition of relevance (e.g., pressure, heat, tension, etc.). Fulfilling any such property tends to favorably increase the life-span of the donor surface.

While in the above-description, the donor surface has been described as being suitable "as is" for the intended particles, further treatments may be applied to facilitate its coating. Such treatments can be broadly classified as chemical treatments (e.g., applying a chemical agent to the donor surface enhancing its affinity to the particles and/or their releasability therefrom) and physical treatments (e.g., corona treatment the discharged plasma suitably modifying the properties of the donor surface). Were such treatments of the donor surface required, a coating apparatus according to the present teachings may further comprise a corresponding treatment station.

The donor surface, whether formed as a sleeve over a drum or a belt over guide rollers or sliders, may further comprise a body forming therewith a particle transfer member. The transfer member body may comprise different layers each providing to the overall transfer member one or more desired property selected, for instance, from mechanical resistivity, thermal resistivity, compressibility (e.g., to improve "macroscopic" contact between the donor surface and an impression cylinder), conformability (e.g., to improve "microscopic" contact between the donor surface and the topography of the outer surface of printing substrate on the impression cylinder), high or low friction depending on the system conveying the transfer member and any such characteristic readily understood by persons skilled in the art of printing transfer members.

The Imaging Station

The imaging station 16 provides one way of selecting the regions of the particle coating applied to the donor surface 12 that will transfer to the substrate 20 at the impression station. As earlier mentioned, such an imaging station is required in the implementation of a digital printing system but other systems that do not comprise an imaging system may employ the above described coating apparatus 14. For example, if the entire surface of the substrate 20 is to be coated, then no imaging system is required and the impression station may instead serve to apply the pressure and/or heat required to ensure an effective transfer of the particle coating from the donor surface 12 to the substrate 20. Likewise, the substrate may reach the impression station having on its surface adhesive applied in a desired pattern, the adhesive stripping off the particles from the monolayer.

An exemplary imaging station 16, shown in FIG. 1, may comprise a support 1601 carrying an array of chips 1602 each having an arrangement of individually controllable laser sources capable of emitting laser beams. The laser sources may by way of example be of VCSEL (Vertical Cavity Surface Emitting Laser) type, however other types may be utilized. The chips 1602 that are optionally arranged in pair(s) of rows in positions that are accurately predetermined relative to one another (e.g., in a staggered manner providing laser sources suitable to target points along the entire width of the donor surface). The support 1601 may be fluid cooled to cope with the significant heat that may be generated by the chips. Laser beams emitted by the chips 1602 are focused onto the surface of the substrate by lenses 1603 constructed as a corresponding number of rows of GRIN (Gradient-Index) rod lenses (each chip 1602, and all laser elements thereupon, being associated with a corresponding focusing lens 1603). Signals supplied to the chips for the activation of one or more laser element are synchronized with the displacement of the substrate so as to allow a high resolution image to be traced on the substrate surface 20 by the emitted laser beams. The effect of the irradiation of each pixel by a laser beam is to render that pixel on the substrate tacky so that particles coating the donor surface 12 are transferred to the substrate 20 when it is pressed against it at the impression station. In other words, such selective irradiation of the surface of the substrate modifies the affinity of the substrate to the particles, so that only the irradiated regions of the substrate are rendered sufficiently tacky the adhere to the particle coating on the donor surface so as to detach the coating from the donor surface and apply it to the selected regions of the substrate.

The digital printing system shown in the drawing can only print in one color but multicolor printing can be achieved by passing the same substrate successively through multiple towers that are synchronized with one another and each printing a different color.

FIG. 2 shows an alternative method of transferring selected regions of the coating to a substrate 20. Instead of rendering selected regions of the substrate surface tacky by exposure to radiation, an adhesive 26 is applied to the substrate 20 by an offset adhesive coating station 36 comprised of an impression cylinder 32, a blanket cylinder 30 and an applicator cylinder 34. This station applies adhesive 26 in the same way as a conventional offset litho tower applies ink. On passage through the nip of impression station 18, particles are transferred from the donor surface 12 only to the regions 26 of the substrate 20 coated with an adhesive. After passing through the nip, the substrate is moved by transport rollers to a stacking station or winding roller (not shown).

The Substrate

The printing system shown in the drawing as a non-limiting example of a system in which a coating apparatus according to present teachings can be integrated, is not restricted to any particular type of substrate. The substrate may be individual sheets of paper or card or it may have the form of a continuous web. The substrate can also be made of a fabric or of leather. Because of the manner in which is the particles are applied to the substrate, the layer of particles tends to reside on the surface of the substrate. This allows printing of high quality to be achieved on paper of indifferent quality. Furthermore, the material of the substrate need not be fibrous and may instead be any type of surface, for example a plastics film or a rigid board and generally assume a wide range of roughness, from very smooth plastic foils to relatively rough fibrous substrates.

The Impression Station

The illustrated impression station 18 comprises only a smooth impression cylinder 22 that is pressed against the drum 10 and its outer donor surface 12. The impression cylinder 22 may form part of a substrate transport system, in which case it may be equipped with grippers for engaging the leading edge of individual substrate sheets. In other than digital printing systems, the impression cylinder may have an embossed surface to select the regions of the particle coating to be transferred to the substrate 20.

In the description and claims of the present disclosure, each of the verbs, "comprise" "include" and "have", and conjugates thereof, are used to indicate that the object or objects of the verb are not necessarily a complete listing of members, components, elements, steps or parts of the subject or subjects of the verb.

As used herein, the singular form "a", "an" and "the" include plural references and mean "at least one" or "one or more" unless the context clearly dictates otherwise.

Positional or motional terms such as "upper", "lower", "right", "left", "bottom", "below", "lowered", "low", "top", "above", "elevated", "high", "vertical", "horizontal", "backward", "forward", "upstream" and "downstream", as well as grammatical variations thereof, may be used herein for exemplary purposes only, to illustrate the relative positioning, placement or displacement of certain components, to indicate a first and a second component in present illustrations or to do both. Such terms do not necessarily indicate that, for example, a "bottom" component is below a "top" component, as such directions, components or both may be flipped, rotated, moved in space, placed in a diagonal orientation or position, placed horizontally or vertically, or similarly modified.

Unless otherwise stated, the use of the expression "and/or" between the last two members of a list of options for selection indicates that a selection of one or more of the listed options is appropriate and may be made.

In the disclosure, unless otherwise stated, adjectives such as "substantially" and "about" that modify a condition or relationship characteristic of a feature or features of an embodiment of the present technology, are to be understood to mean that the condition or characteristic is defined to within tolerances that are acceptable for operation of the embodiment for an application for which it is intended, or within variations expected from the measurement being performed and/or from the measuring instrument being used. When the term "about" precedes a numerical value, it is intended to indicate +/−15%, or +/−10%, or even only +/−5%, and in some instances the precise value.

While this disclosure has been described in terms of certain embodiments and generally associated methods, alterations and permutations of the embodiments and methods will be apparent to those skilled in the art. The disclosure of the invention is to be understood as not limited by the specific embodiments described herein.

The invention claimed is:

1. A coating apparatus for coating with a layer of metal or metal-looking particles a donor surface movable relative to the apparatus, the apparatus comprising:
   a) a supply system configured to supply particles suspended in a fluid that does not wet the donor surface, the particles adhering more strongly to the donor surface than to one another,
   b) an application device configured to form a substantially continuous particle coating on the donor surface by applying the fluid to the donor surface such that at least a portion of the particles suspended in the fluid adhere to the donor surface, and
   c) a suction based surplus extraction system configured to extract fluid and remove surplus particles that are not in direct contact with the donor surface so as to leave adhering to the donor surface a substantially continuous particle coating that is substantially only a single particle deep, the particles or a portion thereof being transferable to a substrate by compressing together the substrate and the donor surface;
   wherein the application device comprises a rotatable applicator configured to wipe the fluid and suspended particles onto the donor surface, the rotatable applicator having a plurality of flexible strips extending radially from a rotatable axle.

2. A coating apparatus as claimed in claim 1, wherein the flexible strips are formed of a closed-cell foam.

3. A coating apparatus as claimed in claim 1, wherein the application device and the surplus extraction system are each independently contained within an interior plenum of a housing having a rim adjacent to the donor surface, the rim being configured to prevent egress of particles from a sealing gap defined between the rim of the housing and the donor surface.

4. A coating apparatus as claimed in claim 3, wherein the surplus extraction system is coupleable to a suction source connected to the housing to extract from the plenum surplus fluid and particles suspended in the surplus fluid.

5. A coating apparatus as claimed in claim 3, further comprising a wiper blade disposed adjacent to the rim at an upstream side of the coating apparatus, for preventing egress of particles and/or fluid.

6. A coating apparatus as claimed in claim 5, wherein the surplus extraction system comprises a suction source connected to the housing to extract from the plenum surplus fluid and particles suspended in the fluid.

7. A coating apparatus as claimed in claim 6, further comprising a fluid flow passage disposed at the rim of the housing to enable fluid to be drawn from the vicinity of the gap, the passage being coupled to the suction source.

8. A coating apparatus as claimed in claim 3, further comprising fluid flow passage disposed at the rim of the housing to enable fluid to be drawn from, or introduced into, at least regions of the sealing gap disposed downstream of the application device.

9. A coating apparatus as claimed in claim 8, wherein the fluid flow passage is coupled to a suction source.

10. A coating apparatus as claimed in claim 8, wherein the fluid flow passage is coupled to a supply of a gas at above ambient pressure and devoid of suspended particles.

11. A coating apparatus as claimed in claim 1, wherein the fluid within which the particles are suspended is a gas.

12. A coating apparatus as claimed in claim 11, wherein the particles are entrained into a stream of the gas by a Venturi tube.

13. A coating apparatus as claimed in claim 1, wherein the fluid within which the particles are suspended is a liquid.

14. A coating apparatus as claimed in claim 13, wherein at least a portion of the liquid is extracted from the donor surface by the surplus extraction system such that the particle layer is at least partially dry or substantially dry on exiting the apparatus.

15. A coating apparatus as claimed in claim 1, wherein particles extracted by the fluid extraction system are recycled to the application device.

16. A coating apparatus as claimed in claim 1, wherein the particles have the form of flat platelets.

17. A coating apparatus as claimed in claim 1, further comprising a burnishing station.

18. A coating apparatus as claimed in claim 1, wherein the application device and the surplus extraction system are contained within a single housing.

19. A coating apparatus as claimed in claim 1, further comprising a burnishing station, wherein the application device, the surplus extraction system and the burnishing station are contained within a single housing.

20. A coating apparatus and an endless donor surface, the donor surface being movable so as to pass cyclically through the coating apparatus and the coating apparatus configured to coat the donor surface or portions thereof during each passage with a layer of metal or metal-looking particles for subsequent transfer of the particles from at least selected regions of the donor surface to a substrate, the coating apparatus comprising:
  a) a supply system configured to supply particles suspended in a fluid that does not wet the donor surface, the particles adhering more strongly to the donor surface than to one another,
  b) an application device configured to form a substantially continuous particle coating on the donor surface by applying the fluid to the donor surface such that at least a portion of the particles suspended in the fluid adhere to the donor surface,
  c) an impression station configured to transfer selected portions of the coating to the substrate; and
  d) a surplus extraction system configured to extract fluid and remove surplus particles that are not in direct contact with the donor surface so as to leave adhering to the donor surface, after each passage through the coating apparatus, the substantially continuous particle coating that is substantially only a single particle deep, the surplus extraction system disposed to perform the extraction between the application device and the impression station.

* * * * *